(12) United States Patent
Kuwabara (10) Patent No.: US 7,934,735 B2
(45) Date of Patent: May 3, 2011

(54) SUSPENSION ARM ASSEMBLY FOR A VEHICLE, AND VEHICLE INCORPORATING SAME

(75) Inventor: Naoki Kuwabara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 82 days.

(21) Appl. No.: 12/583,553

(22) Filed: Aug. 21, 2009

(65) Prior Publication Data
US 2010/0059945 A1    Mar. 11, 2010

(30) Foreign Application Priority Data
Sep. 9, 2008    (JP) ................................ 2008-231539

(51) Int. Cl.
*B60G 3/00*    (2006.01)
(52) U.S. Cl. ....... 280/124.134; 280/124.1; 280/124.133; 280/124.135; 280/124.136; 280/124.139; 280/124.142; 280/124.144
(58) Field of Classification Search ............... 280/124.1, 280/124.133, 124.134, 124.135, 124.136, 280/124.139, 124.142, 124.144
See application file for complete search history.

(56) References Cited

U.S. PATENT DOCUMENTS

| | | | | |
|---|---|---|---|---|
| 2,171,157 A | * | 8/1939 | Mathews | 280/124.144 |
| 2,303,545 A | * | 12/1942 | Graham, Jr. | 280/124.138 |
| 2,996,311 A | * | 8/1961 | Thiry | 280/124.104 |
| 3,161,419 A | * | 12/1964 | Schaaf | 280/124.136 |
| 3,516,684 A | * | 6/1970 | Shakespear | 280/124.134 |
| 3,883,152 A | * | 5/1975 | De Carbon | 280/124.138 |
| 4,132,430 A | * | 1/1979 | Bantle | 280/124.136 |
| 4,763,920 A | * | 8/1988 | Huidekoper | 280/124.138 |
| 4,786,075 A | * | 11/1988 | Takahashi | 180/254 |
| 4,799,708 A | * | 1/1989 | Handa et al. | 280/796 |
| 5,267,751 A | * | 12/1993 | Hiromoto et al. | 280/124.151 |
| 5,362,093 A | * | 11/1994 | Klosterhuber et al. | 280/124.136 |
| 6,431,569 B2 | * | 8/2002 | Handa | 280/124.138 |
| 7,000,931 B1 | * | 2/2006 | Chevalier | 280/93.502 |
| 7,377,549 B2 | * | 5/2008 | Hasegawa et al. | 280/770 |
| 7,571,918 B2 | * | 8/2009 | Bowers | 280/124.138 |
| 2005/0178603 A1 | * | 8/2005 | Takeshima et al. | 180/311 |
| 2005/0221936 A1 | * | 10/2005 | Seki et al. | 474/144 |
| 2005/0248116 A1 | * | 11/2005 | Fanson | 280/124.139 |

(Continued)

FOREIGN PATENT DOCUMENTS
JP    6-15801    4/1994

*Primary Examiner* — Paul N. Dickson
*Assistant Examiner* — Barry Gooden, Jr.
(74) *Attorney, Agent, or Firm* — Carrier Blackman & Associates, P.C.; William D. Blackman; Joseph P. Carrier (57) ABSTRACT

A suspension arm assembly for a vehicle includes a pivot pipe pivotally attached to a vehicle body frame, a pair of pipes extending in a lateral direction of a vehicle body, a joint member attached to distal end portions of the pipes, and a substantially U-shaped band. Proximal end portions of the pipes are connected to the pivot pipe and spaced apart from each other in a front-rear direction, and distal end portions thereof are arranged close to each other, thereby forming a substantially triangular profile. The joint member includes a plate portion and a boss portion having a knuckle attached thereto. The distal end portions of the pipes are operatively connected to a convex surface of the U-shaped band, and the plate portion of the joint member is attached to the pipes for covering the U-shaped band.

20 Claims, 6 Drawing Sheets

U.S. PATENT DOCUMENTS

2007/0075514 A1* 4/2007 Saiki ................. 280/124.103
2007/0228684 A1* 10/2007 Bowers ............... 280/124.134
2008/0179853 A1* 7/2008 Kuwabara et al. ..... 280/124.134
2009/0184484 A1* 7/2009 Gerrard .............. 280/124.144
2009/0218783 A1* 9/2009 Brandl et al. ........ 280/124.135
2009/0243248 A1* 10/2009 Nakamura et al. ..... 280/124.135

* cited by examiner

SUSPENSION ARM ASSEMBLY FOR A VEHICLE, AND VEHICLE INCORPORATING SAME

CROSS-REFERENCE TO RELATED APPLICATIONS

The present invention claims priority under 35 USC 119 based on Japanese patent application No. 2008-231539, filed on Sep. 9, 2008. The entire subject matter of this priority document, including specification claims and drawings thereof, is incorporated by reference herein.

BACKGROUND OF THE INVENTION

1. Field of the Invention

The present invention relates to a suspension arm assembly for a vehicle, and to a vehicle incorporating the same. More particularly, the present invention relates to a suspension arm assembly including a pair of pipes, and a substantially U-shaped band operatively attached to end portions of the pair of pipes, the U-shaped band including a convex surface, and a concave surface facing outwardly of the vehicle body. The invention also relates to a multi-use vehicle incorporating the suspension arm assembly.

2. Description of the Background Art

A number of different vehicle suspension arm assemblies are known. An example of a known suspension arm assembly is disclosed in Japanese Examined Utility Model Publication No. Hei 06-15801.

In the suspension arm assembly disclosed in Japanese Examined Utility Model Publication No. Hei 06-15801, since a wheel is attached to the boss with a knuckle, vibrations from contact of a wheel with the road surface tend to be easily transmitted to the suspension arm assembly. It is desirable to secure rigidity of the suspension arm assembly, in order to minimize transmission of shocks and vibration from the road surface to the suspension arm assembly.

However, in the conventional structure, the suspension arm assembly is formed by bonding the distal end (outer end) portions of two pipes to an outer circumferential surface of a boss. Thus, in order to secure the rigidity of the suspension arm assembly, the structure of the suspension arm assembly needs to be firm, for example, by increasing the diameters of the pipes or the thickness of the boss, which disadvantageously leads to an increase in the weight of the suspension arm assembly.

The present invention has been made to overcome such drawbacks of the existing vehicle suspension arm assemblies. Accordingly, it is one object of the present invention to provide a vehicular suspension arm assembly that is lighter in weight than the previously known suspension arm assemblies, while a desired rigidity thereof is achieved.

SUMMARY OF THE INVENTION

In order to achieve the above objects, the present invention according to a first aspect thereof provides a suspension arm assembly for a vehicle. The vehicle includes a vehicle body frame, a vehicle body mounted on the vehicle body frame, and a suspension system that is attached to the vehicle body frame. The suspension system includes a shock absorber, the suspension arm assembly, and a knuckle.

The suspension arm assembly according to the present invention includes a pivot pipe pivotally attached to the vehicle body frame; a pair of pipes extending in a lateral direction of a vehicle body, the pair of pipes having proximal portions (one end portions) respectively connected to the pivot pipe and spaced apart from each other in the front-rear direction of the vehicle body, and distal end portions (the other end portions) thereof arranged close to each other, and extending toward an outer side (outwardly) of the vehicle body, so as to form a substantially triangular profile; and a joint member attached to the distal end portions of the pair of pipes. The joint member includes a plate portion and a boss portion to which the knuckle is attached.

The suspension arm assembly according to a first illustrative embodiment of the present invention includes a substantially U-shaped band arranged at the distal end portions of the pair of pipes, and arranged such that an open concave surface of the U-shape plate faces outwardly, i.e., the U-shaped band is open toward the exterior of the vehicle body. The distal end portions of the pair of pipes are connected to a convex surface of the U-shaped band. The plate portion of the joint member is attached to the pair of pipes so as to cover the U-shaped band from above or below.

According to the first aspect of the present invention, since the distal end portions of the pair of pipes are connected to the convex surface of the U-shaped band, the area of the connected surface between the pair of pipes and the U-shaped band is increased. Accordingly, the strength of the connection of the pair of pipes with the U-shaped band is improved.

Moreover, since the plate portion of the joint member is attached to the pair of pipes so as to cover the U-shaped band from above or below (top and bottom portions), the joint member, the pipes and the U-shaped band are spatially combined. As a result, the distal end portion of the suspension arm assembly has a spatial structure, thereby improving the rigidity of the suspension arm assembly. Accordingly, the rigidity of the suspension arm assembly can be secured, and the suspension arm assembly can be reduced in weight without requiring additional structures for increasing the diameter of each of the pipes, or the thickness of the boss.

The present invention according a second aspect thereof, in addition to the first aspect, is characterized in that, an outer circumferential end portion of the plate portion of the joint member is bent downwardly so as to surround the boss portion thereby forming a wall portion such that the plate portion of the joint member is formed in a substantially angular U-shaped profile having an opening on a side (e.g., a left side), when viewed in a cross sectional view.

According the second aspect of the present invention, the outer circumferential end portion of the plate portion is bent downwardly so as to surround the boss, thereby forming the wall portion. Accordingly, the rigidity of the boss portion of the joint member can be increased. Also, the wall portion has the angular U shape, when viewed in a cross sectional view. Such angular U shape allows the wall portion to be mated and fitted onto the U-shaped band and the pair of pipes. Thus, the distal end portion, at the exterior of the vehicle body, of the suspension arm assembly has a spatial structure, thereby making it possible to secure and achieve a desired higher rigidity thereof.

The present invention according to a third aspect thereof, in addition to the first aspect, is characterized in that the U-shaped band is disposed at a position such that a distance between a curved portion of the U-shaped band and the center of the boss portion is greater than a distance between the center of the boss portion and a distal end portion of the boss portion, and a space is provided between the boss portion and the U-shaped band. In other words, the boss portion of the joint member is arranged at a position spaced away from the U-shaped band.

Accordingly, a large space is formed between the U-shaped band and the boss portion, so that interference between the knuckle attached to the boss portion and the U-shaped band can be prevented. Such interference generally occurs when the suspension arm assembly operated.

Moreover, it is possible to employ a structure in which the U-shaped band is formed to have distal end portions thereof narrower than the other portion thereof, when viewed in a side view. Accordingly, interference between the knuckle attached to the boss portion and the U-shaped band can be prevented. As stated above, such interference occurs when the suspension arm assembly is operated during operation of the vehicle.

The present invention is further characterized in that it is possible to employ a structure in which the outer circumferential end portion, which is bent downwardly for surrounding the boss portion, of the plate portion of the joint member has a distal end portion at the exterior of the vehicle body, the distal end portion having a height less than that of the other portions thereof, when viewed in a side view.

Accordingly, since the outer circumferential end portion of the plate portion of the joint member is bent downwardly so as to surround the boss portion, the rigidity of the boss portion can be increased. In addition, the height of the distal end portion, at the exterior of the vehicle body, of the outer circumferential end portion of the plate portion is less than the height of the other portions thereof, when viewed in a side view, so that interference between the knuckle attached to the boss portion and the distal end portion of the plate portion of the joint member can be prevented. Such interference occurs when the suspension arm assembly is operated. Thus, the moving range of the knuckle can be made larger.

EFFECTS OF THE INVENTION

According to the present invention, the distal end portions (at the exterior of the vehicle body) of the pair of pipes are connected to the convex surface of the U-shaped band, so that the area of the connected surface between each of the pair of pipes and the U-shaped band is increased. Thus, the strength of the connection of the pair of pipes with the U-shaped band is improved.

Moreover, since the plate portion of the joint member is attached to the pair of pipes so as to cover the U-shaped band from above or below, the joint member, the pipes and the U-shaped band are spatially combined. As a result, the distal end portion of the suspension arm assembly has an improved spatial structure, thereby improving the rigidity of the suspension arm assembly. Accordingly, the rigidity of the suspension arm assembly can be secured. Also, the weight of the suspension arm assembly can be reduced, without employing one or more additional structures, which requires increasing the diameter of each of the pair of pipes and/or the thickness of the boss portion of the joint member.

In addition, the outer circumferential end portion of the plate portion is bent downwardly in an area adjacent the boss portion, thereby forming a wall. Accordingly, the rigidity of the boss portion of the joint member can be increased. Meanwhile, the wall has an angular U shape, when viewed in a cross-sectional view. Such angular U shape allows the wall portion to be mated and fitted onto the U-shaped band and the pair of pipes. Thus, the distal end portion of the suspension aim assembly has an improved spatial structure, making it possible to secure a higher rigidity.

Furthermore, a large space is formed between the U-shaped band and the boss portion, so that interference between the knuckle attached to the boss portion and the U-shaped band can be prevented. Such interference may occur during operation of the suspension arm assembly.

Additionally, when viewed in a side view, the distal end portions of the U-shaped band are formed narrower than other portions thereof, so that interference between the knuckle attached to the boss portion and the U-shaped band can be prevented during operation of the suspension arm assembly.

Moreover, since the outer circumferential end portion of the plate portion of the joint member is bent downwardly in an area adjacent the boss portion, the rigidity of the boss portion can be increased. In addition, since the height of the distal end portion, at the exterior of the vehicle body, of the outer circumferential end portion of the plate portion is less than that of the other portion thereof, when viewed in a side view, the interference between the knuckle attached to the boss portion and the distal end portion, at the exterior of the vehicle body, of the joint member can be prevented. Accordingly, the moving range of the knuckle can be made wider. The interference occurs when the suspension arm assembly is operated.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

A selected illustrative embodiment of the present invention will now be described, with reference to the drawings. Throughout this description, relative terms like "front", "rear," "upper", "lower", "above", "below", "front", "back", and the like are used in reference to a vantage point of an operator of the vehicle, seated on the driver's seat and facing forward. It should be understood that these relative positional terms are used for purposes of illustration, and are not intended to limit the invention.

Figure 1:
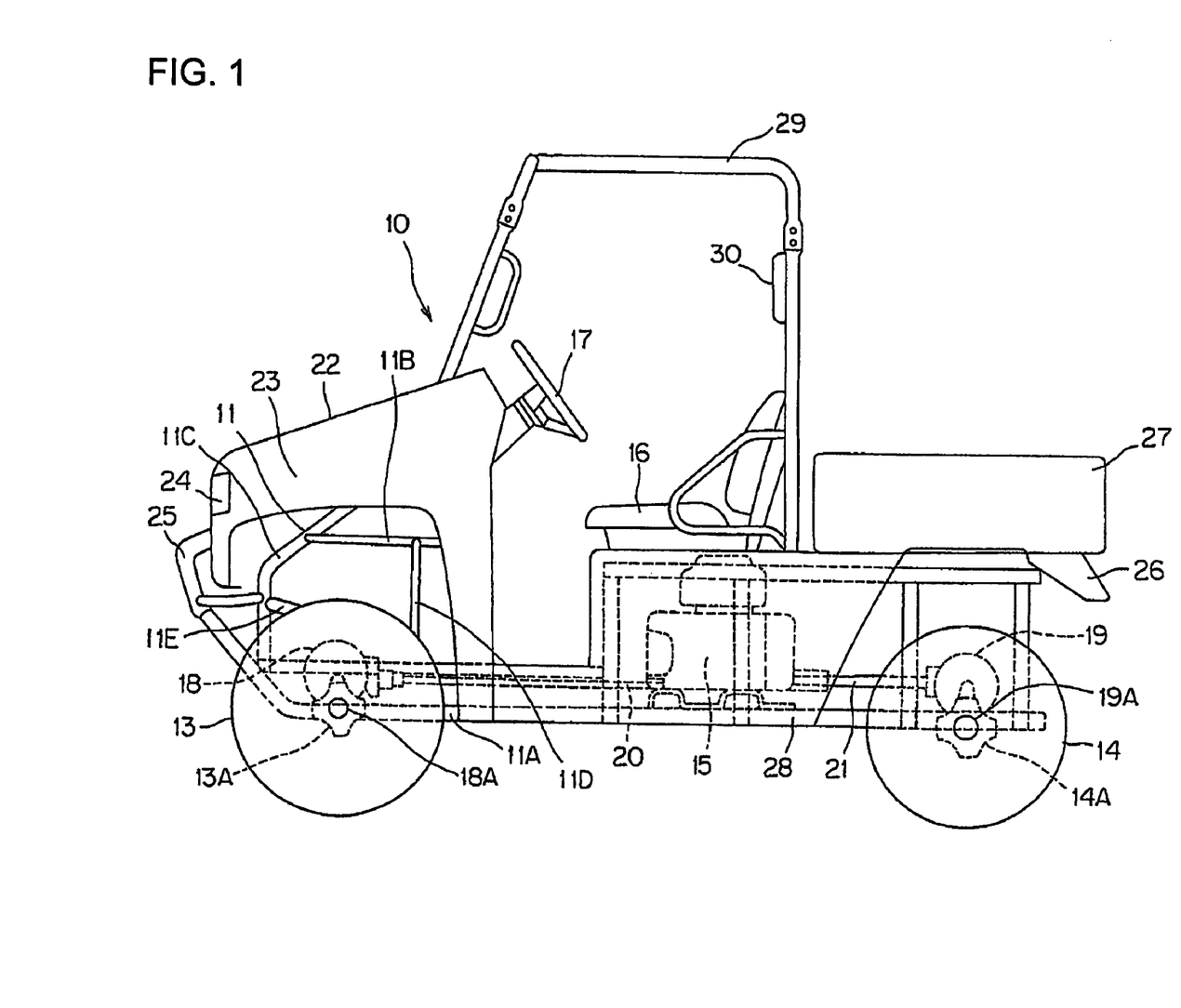
FIG. 1 is a side plan view of a multi-use vehicle according to an illustrative embodiment of the present invention.

FIG. 1 is a side plan view of a vehicle 10, which may be a small or a large vehicle, according to an illustrative embodiment of the present invention. The vehicle 10, which may be classified as multi-use vehicle (MUV), is suitable for driving in an off-road environment on rough, undulated ground (un-leveled ground).

Figure 2:
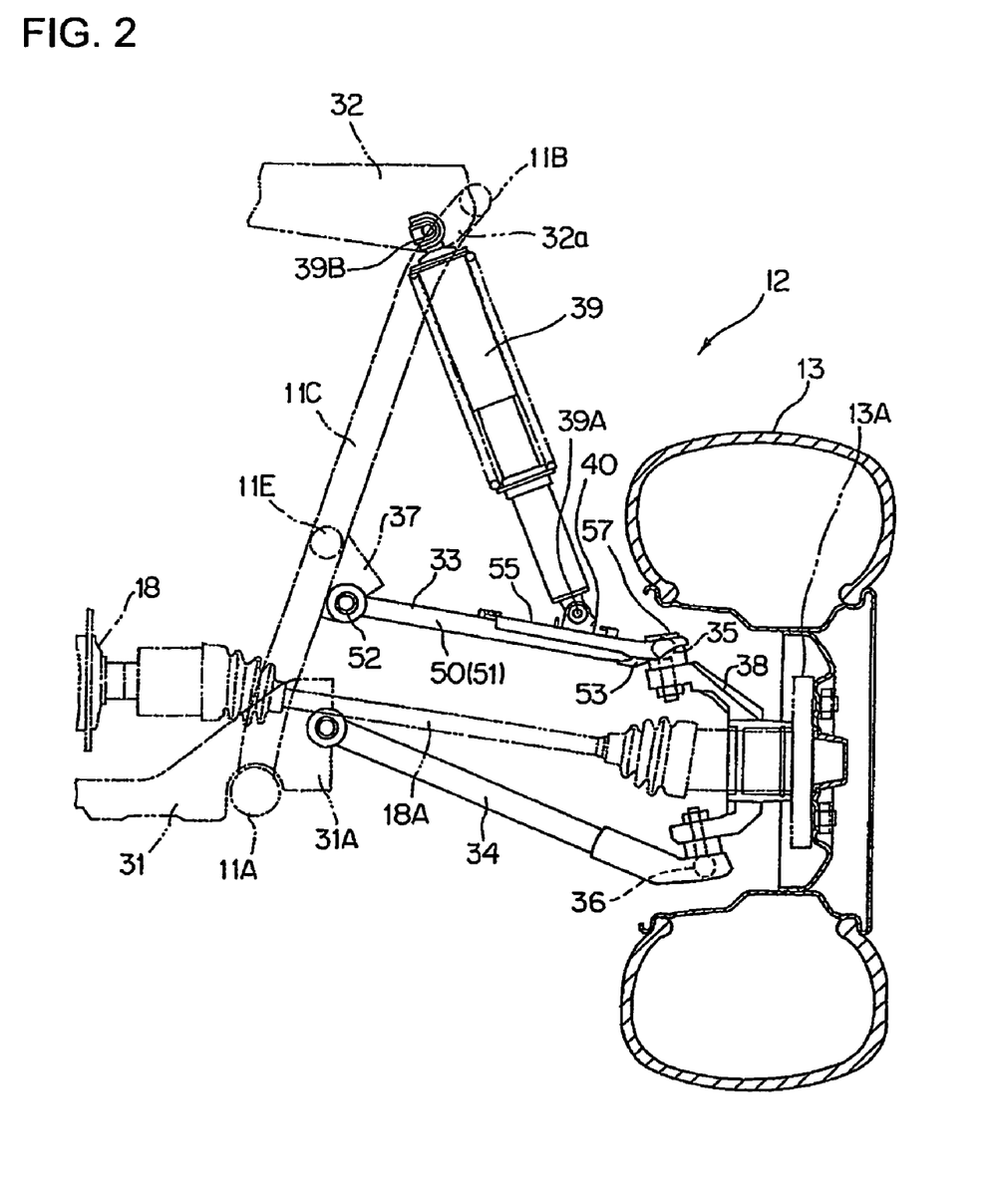
FIG. 2 is a front plan view of a suspension arm assembly according to an illustrative embodiment of the present invention, with a wheel and tire shown in cross-section.

The vehicle 10 includes right and left front wheels 13, 13 independently suspended on a vehicle body frame 11 respectively via front suspensions (suspension systems, see FIG. 2). The vehicle 10 also includes right and left rear wheels 14, 14 independently suspended on the vehicle body frame 11 respectively via rear suspensions (double wishbone suspension system, for example) (not shown).

The vehicle 10 also includes a power unit 15, including an engine and a transmission system supported by the vehicle body frame 11 at a position between the front wheels 13, 13 and the rear wheels 14, 14 (at a substantially intermediate position of the front-rear direction of the vehicle). The vehicle 10 also includes two passenger seats 16, 16, serving as a driver's seat and a passenger's seat, supported above the power unit 15 on the vehicle body frame 11, and a steering wheel 17 operatively connected to the front wheels 13, 13, for steering the front wheels.

A front wheel final reduction gear unit 18 is supported on the vehicle body frame 11 between the right and left front wheels 13, 13. The final reduction gear unit 18 is connected to the right and left front wheels 13, 13 respectively via drive shafts 18A connected respectively to right and left sides of the final reduction gear unit 18.

Further, a rear wheel final reduction gear unit 19 is supported on the vehicle body frame 11 between the right and left rear wheels 14, 14. The final reduction gear unit 19 is connected to the rear wheels 14, 14 respectively via drive shafts 19A connected respectively to right and left sides of the final reduction gear unit 19.

As shown in FIG. 1, the vehicle 1 includes a first hub 13A arranged on the front wheel 13 side, and having the drive shaft 18A connected thereto, a second hub 14A arranged on the rear wheel 14, and having the drive shaft 19A connected thereto. The vehicle 10 includes a brake system (not shown) for braking the front wheels 13, 13 and the rear wheels 14, 14.

A front propeller shaft 20 and a rear propeller shaft 21 are each connected to the power unit 15. The rotary speed of the engine is reduced by the transmission system using transmission gear ratio corresponding to a predetermined transmission gear, and then transmitted to both the propeller shafts 20 and 21.

The front propeller shaft 20 extends from a lower portion of the power unit 15 in a front direction, and connected to the final reduction gear unit 18, thereby transmitting the driving force of the power unit 15 to the front wheels 13, 13 via the final reduction gear unit 18.

Further, the rear propeller shaft 21 extends from a lower portion of the power unit 15 in a rear direction, and connected to the final reduction gear unit 19, thereby transmitting the driving force of the power unit 15 to the rear wheels 14, 14 via the final reduction gear unit 19.

A front portion of the vehicle 10 is provided with a bonnet 22 covering a front portion of the vehicle body from above; a pair of right and left front fenders 23, 23 located respectively at right and left sides of the bonnet 22 and covering upper portions and rear portions of the front wheels 13, 13, respectively; a headlight 24 for illuminating an area ahead of the vehicle 10; and a carry pipe 25 for protecting the front portion of the vehicle 10.

In addition, a rear portion of the vehicle 10 is provided with a pair of right and left rear fenders 26, 26 covering upper portions of the rear wheels 14, 14, respectively; a box-shaped loading platform 27 having an opening at an upper portion thereof for loading, and the like.

Moreover, vehicle body covers 28 are provided to both side portions of the vehicle 10. The vehicle body covers 28 cover the right and left sides of the power unit 15 between the front fenders 23, 23 and the rear fenders 26, 26, respectively. A roll bar 29 obtained by assembling frame members is also provided to the vehicle 10 so as to substantially surround a space (driving cab) of each of the passengers seated on the passenger seats 16, 16. Two headrests 30, 30 arranged respectively at positions above the passenger seats 16, 16 are attached to the roll bar 29.

The vehicle body frame 11 includes a lower frame 11A, an upper frame 11B, a front frame 11C, a down frame 11D and a reinforcement frame 11E. Each of these frames 11A, 11B, 11C, 11D and 11E is provided as a pair of right and left frame sections which are substantially symmetrical to one another.

The lower frame 11A extends substantially parallel to a bottom portion of the vehicle 10 in a front-rear direction thereof. The upper frame 11B extends above the lower frame 11A in the front-rear direction. The front frame 11C extends in an up-down direction so as to connect the lower frame 11A and the upper frame 11B at a front side inside the front portion of the vehicle body. The down frame 11D (FIG. 1) extends in an up-down direction so as to connect the lower frame 11A and the upper frame 11B at a rear side inside the front portion of the vehicle body. The reinforcement frame 11E extends in a front-rear direction so as to connect the front frame 11C and the down frame 11D.

In addition, a lower cross frame 31 is provided between the pair of the right and left lower frames 11A, 11A. Moreover, an upper cross frame 32 is provided between the pair of the right and left upper frames 11B, 11B.

Front Suspension System

Next, a description of front suspensions 12 with reference to FIG. 2 is provided. FIG. 2 is a front plan view of a suspension arm assembly, with a wheel and tire shown in cross-section.

The front suspensions 12 are bilaterally symmetric with respect to the vehicle body, and thus the structures thereof are the same or substantially similar. For this reason, only the description of the front suspension 12 on the left side is provided, and redundant discussion of the front suspension 12 on the right side is omitted in the following description.

It may be noted that the vehicle body frame 11, the drive shaft 18A and the like are illustrated by broken lines in FIG. 2. The front suspension 12 is supported by the vehicle body frame 11 at the front portion of the vehicle body.

The front suspension 12 according the illustrative embodiment is a double wishbone suspension system. The front suspension 12 includes an upper arm 33 (also referred as a suspension arm assembly 33), and a lower arm 34. The reinforcement frame 11E is provided with a bracket 37 to which the suspension arm assembly (upper arm) 33 is connected in a vertically swingable manner.

A supporting portion 31A for supporting the lower arm 34 in the vertically swingable manner is provided at both end portions of the lower cross frame 31. Moreover, a bracket (not shown) to which the lower arm 34 is connected in the vertically swingable manner is provided at a rear side beyond the lower cross frame 31. Also the lower arm 34 is located at a rear side beyond the lower cross frame 31.

The upper arm 33 and the lower arm 34 include ball joints 35 and 36 at distal ends thereof, respectively. The respective distal ends of the upper arm 33 and lower arm 34 each protrude in a lateral, or side direction of the vehicle 10. The distal ends of the upper arm 33 and the lower arm 34 are vertically connected to each other by a knuckle 38, via the ball joints 35 and 36. The drive shaft 18A extending from the final reduction gear unit 18 protrudes in a side direction of the vehicle, and is rotatably supported by the knuckle 38. The hub 13A on the front wheel 13 side is connected to the distal end of the drive shaft 18A, so that the front wheel 13 is rotatably driven.

Further, the front suspension 12 includes a front shock absorber 39 disposed between the upper arm 33 and the upper cross frame 32 (described above). A bracket 40 is provided on a top surface of the upper arm 33 for supporting a lower end portion 39A of the shock absorber 39. Moreover, a supporting portion 32A for supporting an upper end 39B of the shock absorber 39 is provided at each end portion of the upper cross frame 32.

Next, the suspension arm assembly (upper arm) 33 is described. In the illustrative embodiment, the structure of the upper arm 33 has a characteristic feature.

Figure 3:
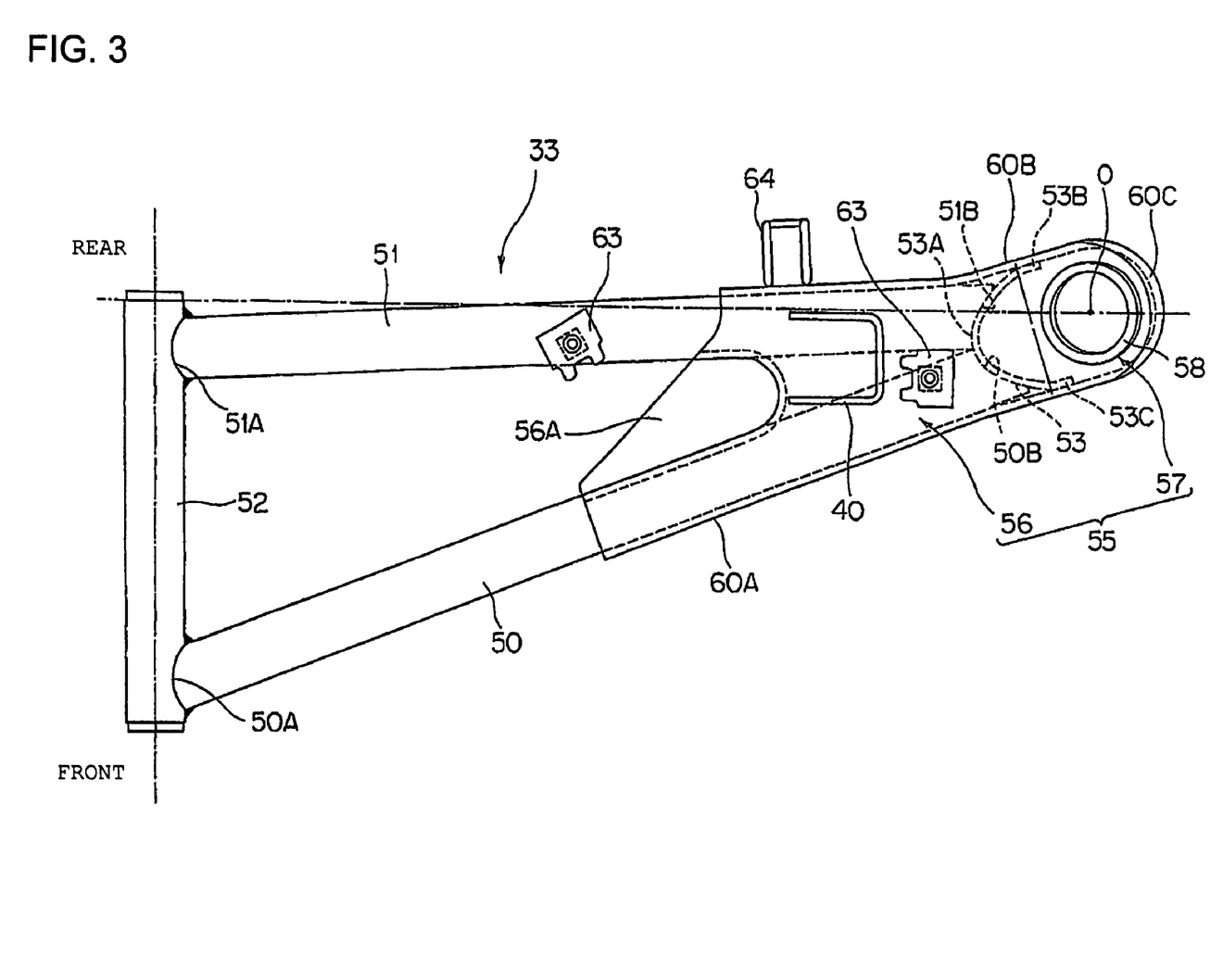
FIG. 3 is a top plan view of an upper suspension arm of the suspension arm assembly of FIG. 2.
Figure 4:
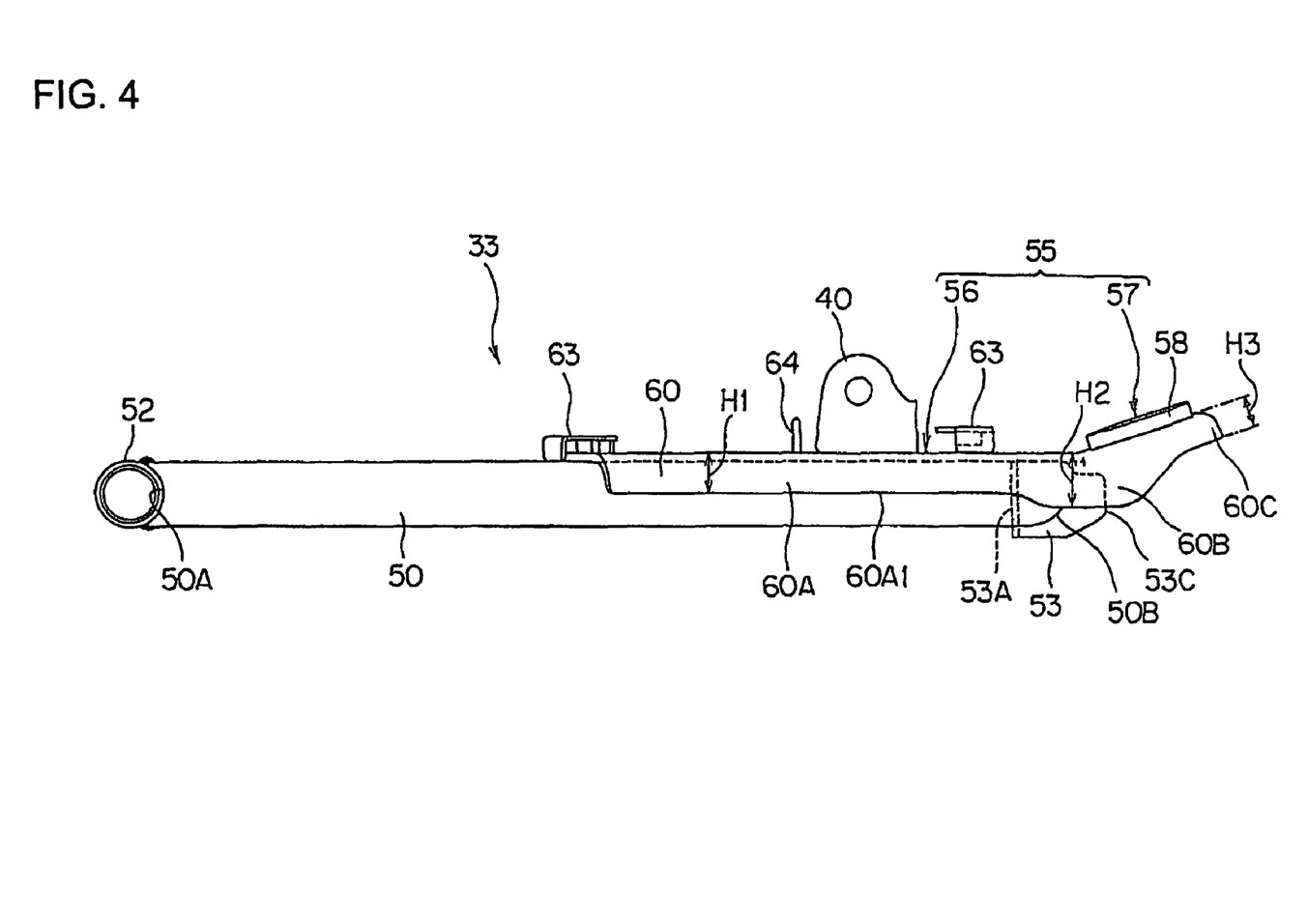
FIG. 4 is a side plan view of the upper suspension arm assembly of FIGS. 2-3.
Figure 5:
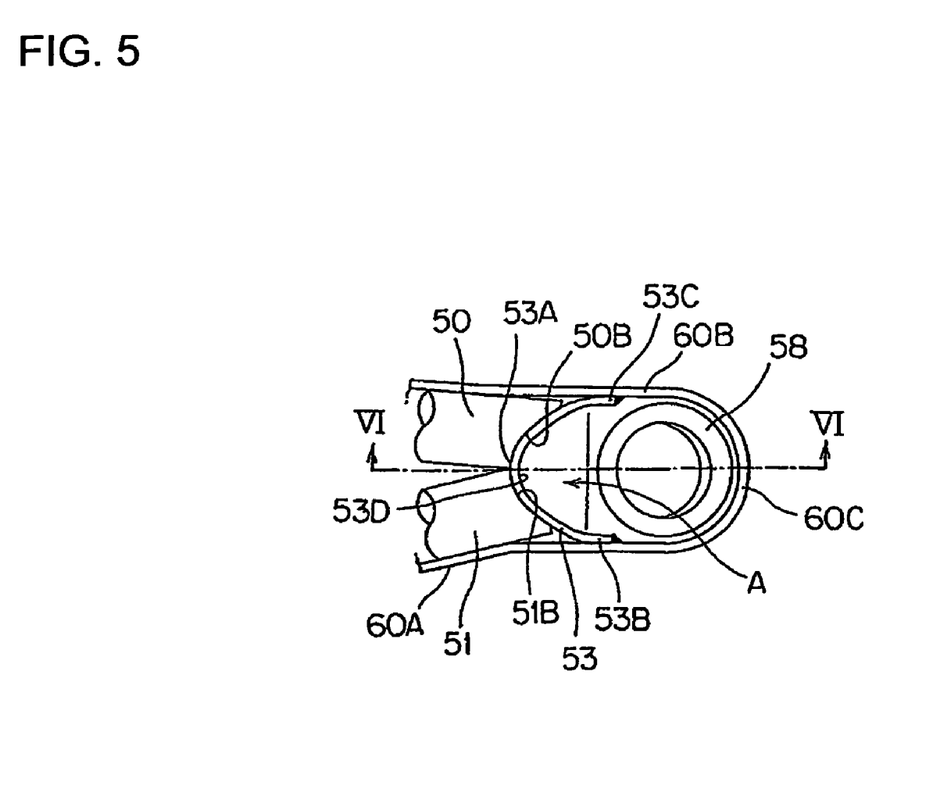
FIG. 5 is a bottom view of a distal end portion of the upper suspension arm as viewed from a lower direction.
Figure 6:
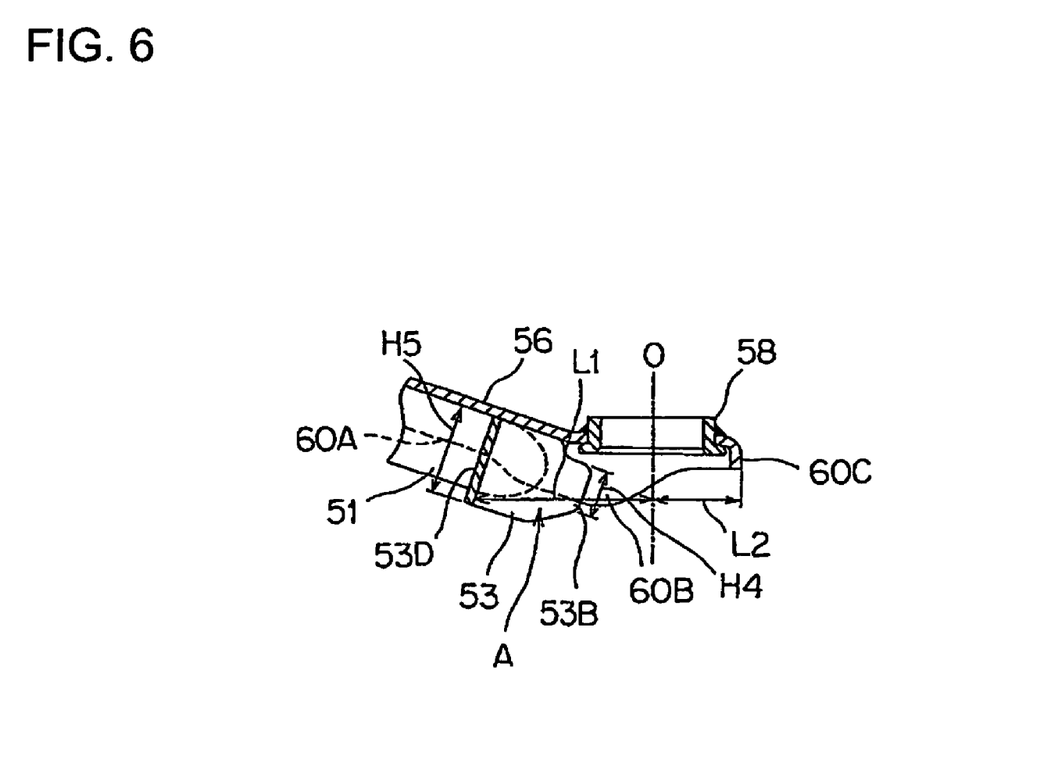
FIG. 6 is a cross sectional view of the upper suspension arm, taken along the line VI-VI of FIG. 5.

FIG. 3 is a top plan view of the upper arm 33. FIG. 4 is a side plan view of the upper arm 33 as viewed from the front side of the vehicle body. FIG. 5 is a detail bottom plan view of the upper arm 33, with a distal end portion thereof viewed from below. FIG. 6 is a cross sectional view taken along the line VI-VI of FIG. 5.

The upper arm 33 shown in FIGS. 3-6 is used for the front suspension 12 on the left side of the vehicle body. The upper arm 33 provided on the left side of the vehicle body has the same or substantially similar structure as that of the upper arm 33 provided on the right side of the vehicle body. However, the upper arm 33 on the left side of the vehicle body may have a shape which may be symmetrical or asymmetrical to the lower arm 34 on the left side of the vehicle body.

As shown in FIG. 3, the upper arm 33 includes a pair of pipes including a front pipe 50 and a rear pipe 51 arranged side by side and extending in a lateral direction of the vehicle body. In addition, when viewed in a top plan view, the front pipe 50 and rear pipe 51 are arranged substantially in a letter "V" shape. Moreover, proximal end portions 50A and 51A of the front pipe 50 and rear pipe 51, respectively, are spaced apart from each other in the front-rear direction of the vehicle body. The proximal end portions 50A and 51A of the front pipe 50 and rear pipe 51 are connected to a pivot pipe 52 by welding. These are called the proximal end portions because they are closer to the longitudinal center line of the vehicle than the distal end portions 50B and 51B.

Further, the distal end portions 50B and 51B of the front pipe 50 and rear pipe 51, respectively, converge to extend close to each other toward the exterior of the vehicle body, and are connected to a substantially U-shaped band 53 by welding. In this manner, when viewed in a top plan view as seen in FIG. 3, the upper arm 33 as a whole is configured in a substantially triangular profile.

The pivot pipe 52 is a pipe member made of an appropriate material such as iron, steel or a ferrous alloy. The pivot pipe 52 is pivotally attached to the bracket 37 of the reinforcement frame 11E (FIG. 2). The U-shaped band 53 is a plate member that is formed to have a substantially "U" shape by bending an appropriate material such as iron. The U-shaped band 53 is arranged so as to have its opening facing toward an exterior of the vehicle body.

Each of the distal end portions 50B and 51B of the front pipe 50 and the rear pipe 51, respectively, is connected to a convex surface 53A of the U-shaped band 53. Moreover, the U-shaped band 53 is formed so that the distance between both end portions 53B and 53C thereof is substantially the same as the total combined diameter of the front pipe 50 and the rear pipe 51.

In addition, the upper arm 33 includes a joint member 55 connected to the knuckle 38. The joint member 55 includes a plate portion 56 extending along and above the front pipe 50 and the rear pipe 51, and a boss portion 57 formed at a distal end portion of the plate portion 56. As shown in FIG. 4, the boss portion 57 is formed by bending the joint member 55 obliquely upwardly at a portion near the outer end portions 53B and 53C of the U-shaped band 53.

Moreover, as shown in FIG. 3, the boss portion 57 includes an annular collar 58 extending upwardly thereon and attachable to an opening (not shown) formed at an exterior of the vehicle body beyond the end portions 53B and 53C of the U-shaped band 53. The ball joint 35 (FIG. 2) is fitted into the annular collar 58.

When viewed in a top plan view, the plate portion 56 of the joint member 55 is formed in a modified triangular shape. The plate portion 56 is attached to the front pipe 50, the rear pipe 51, and the U-shaped band 53, so as to cover the U-shaped band 53 from above, at the distal ends of the front pipe 50 and the rear pipe 51.

Specifically, as shown in FIG. 3, the plate portion 56 includes a wall 60 formed in a substantially angular U shape in a cross sectional view. The wall 60 is formed by bending outer circumferential edges of the plate portion 56 downwardly along respective outer faces of the front pipe 50, the rear pipe 51 and a distal area laterally outside of the U-shaped band 53.

The wall 60 includes first wall portions 60A formed respectively along the front pipe 50 and the rear pipe 51; second wall portions 60B communicating respectively with the first wall portions 60A and formed along the U-shaped band 53; and a third wall portion 60C integrally extending from and communicating with the second wall portions 60B. The third wall portion 60C forms a distal end portion of the plate portion 56 of the joint member 55, at an exterior of the vehicle body. The distal end portion, together with the second wall portions 60B, surrounds the collar 58 of the boss portion 57.

As shown in FIG. 4, each first wall portion 60A has a height H1 approximately half of the diameter of each of the front pipe 50 and the rear pipe 51. An edge 60A1 of each first wall portion 60A is bonded to a side surface of a corresponding front or rear pipe by welding. Each second wall portion 60B has a height H2 greater than the height H1 of the first wall portion 60A.

As shown in FIG. 5, the end portions 53B and 53C of the U-shaped band 53 are respectively bonded to inner side portions of the second wall portions 60B by welding. As previously noted, the boss portion 57 is formed by bending the joint member 55 obliquely upwardly at an area thereof near the end portions 53B and 53C of the U-shaped band 53. Accordingly, forming the height H2 of the second wall 60B greater than the height H of the first wall 60A allows an improvement in the rigidity of the boss portion 57.

In addition, the distance between the second wall portions 60B, 60B is formed substantially the same as, or only incrementally greater than, the distance between the end portions 53B and 53C of the U-shaped band 53. Thus, when the plate portion 56 of the joint member 55 is disposed on the front pipe 50 and the rear pipe 51, the second wall portions 60B, 60B of the plate portion 56 are mated and fitted onto the end portions 53B and 53C of the U-shaped band 53, respectively.

In the above-described manner, the joint member 55, the front pipe 50, the rear pipe 51 and the U-shaped band 53 are spatially combined, and the distal end portion of the upper arm 33, near the exterior of the vehicle body, has a reinforced structure. Accordingly, the rigidity of the upper arm 33 can be improved.

Meanwhile, as shown in FIG. 4, a height H3 of the third wall 60C is formed less than the height H2 of the second wall 60B. In this structure, as also shown in FIG. 5, the third wall 60C is formed near an outer edge of the collar 58. Thus, there is a concern that the third wall 60C and the knuckle 38 attached to the boss portion 57 may possibly interfere with each other if the third wall 60C is formed to have a significantly larger height than that shown at H3.

For this reason, the height H3 of the third wall 60C is formed less than the height H2 of the second wall 60B. In this manner, interference between the third wall 60C and the knuckle 38 is prevented when the upper arm 33 operated.

As also shown in FIGS. 4-5, the U-shaped band 53 is disposed adjacent the collar 58, and the height of the U-shaped band is formed greater than the diameter of the front pipe 50 or the rear pipe 51, in order to increase the area of the surface of the U-shaped band 53 to be connected to the front pipe 50 and the rear pipe 51. For this reason, there is a concern that the U-shaped band 53 and the knuckle 38 interfere with each other when the upper arm 33 is operated.

In the suspension arm assembly structure according to the illustrative embodiment, as shown in FIG. 6, the U-shaped band 53 is disposed at such a position that a distance L1 between a curved bight portion 53D of the U-shaped band 53 and a center O of the boss portion 57 is greater than a distance L2 between the center O of the boss portion 57 and the exterior surface of the third wall portion (distal end portion) 60C located at the vehicle body end side of the boss portion 57.

Accordingly, even in a case where the height of the U-shaped band 53 is formed larger, interference between the U-shaped band 53 and the knuckle 38 when the upper arm 33 operated can be prevented, because as shown in FIG. 6, a space A is formed between the curved bight portion 53D of the U-shaped band 53 and the boss portion 57.

In addition, the U-shaped band 53 is formed so that the end portions (distal end portions) 53B and 53C can be made narrower than the curved portion 53D (other portion), when viewed in a side view. Specifically, upper and lower corner portions of each of the end portions 53B and 53C are notched, so that a height H4 of each of the end portions 53B and 53C is less than a height H5 of the curved portion 53D.

Accordingly, even in a case where the height of the U-shaped band 53 is formed larger, when the suspension arm assembly 33 operated, interference between the U-shaped band 53 and the knuckle 38 can be prevented. This is because the height H4 of the distal end portions 53B and 53C of the U-shaped band 53, near the center O of the boss portion 57 is formed smaller than the height of other portions of the U-shaped band, as shown in FIG. 6.

In addition, as shown in FIG. 3, the plate portion 56 includes a step portion 56A formed at a lower height than the plate portion 56 by one step. The step portion 56A is formed between the front pipe 50 and the rear pipe 51. The step portion 56A is integrally formed with the plate portion 56 by, for example, press working. The edge portion of the rear surface side of the step portion 56A is bonded to side surfaces of the front pipe 50 and the rear pipe 51, respectively, by welding.

According to the illustrative embodiment, the step portion 56A and the plate portion 56 are integrally formed, so that the number of components can be reduced, and the edge portion of the step portion 56A can be easily welded to the front pipe 50 and the rear pipe 51. Further, the forming of the step portion 56A in the plate portion 56 can increase the rigidity of the plate portion 56. As a result, the rigidity of the upper arm 33 can be improved.

Moreover, as shown in FIG. 3, the bracket 40, to which the lower end portion 39A of the shock absorber 39 is connected, is attached to the top surface of the plate portion 56 by welding. The bracket 40 is formed in a substantially angular U shape, and thereby has a pair of wall surfaces facing each other. The lower end portion 39A of the shock absorber 39 housed between the pair of wall surfaces is rotatably attached to the bracket 40 by a bolt and a nut. A bracket 63 for supporting a brake hose (not shown), and a hose guide 64 for guiding the hose (not shown) are mounted on the suspension arm assembly 33.

As discussed above, according to the illustrative embodiment, each of the distal end portions 50B and 51B of the pair of the front pipe 50 and the rear pipe 51 is connected to the curved surface portion 53A of the U-shaped band 53, so that the area of the connected surface between each of the pair of the front pipe 50 and the rear pipe 51 and the U-shaped band 53 is increased. Thus, the strength of connection of the pair of the front pipe 50 and the rear pipe 51 is improved.

Moreover, since the plate portion 56 of the joint member 55 is attached to the pair of the front pipe 50 and the rear pipe 51 so as to cover the U-shaped band 53 from above, the plate portion 56, the front pipe 50, the rear pipe 51 and the U-shaped band 53 can be spatially combined. As a result, the distal end portion, at the exterior of the vehicle body, of the upper arm 33 has a spatial structure, so that the rigidity of the upper arm 33 can be improved.

Accordingly, the rigidity of the upper arm 33 can be secured. Also, weight of the upper arm 33 can be reduced, without requiring a structure, in which the diameter of each of the pair of the front pipe and the rear pipe is increased, or the thickness of the boss portion is increased to which the knuckle is attached.

Further, according to the illustrative embodiment, the outer circumferential end portion of the plate portion 56 is bent downward so as to surround the boss portion 57, thereby forming the second and third wall portions 60B and 60C. Thus, the rigidity of the boss portion 57 of the joint member 55 can be increased. Moreover, the second and third wall portions 60B and 60C, and the first wall portions 60A integral with the second and third wall portions 60B and 60C have the angular U shape, when viewed in a cross sectional view.

Such angular U shape allows the wall portions 60A, 60B and 60C to be mated and fitted onto the U-shaped band 53 and the pair of the front pipe 50 and the rear pipe 51. As a result, the distal end portion, at the exterior of the vehicle body, of the upper arm 33 has a spatial structure. Accordingly, it is possible to secure a higher rigidity for the suspension arm assembly.

Moreover, according to the illustrative embodiment, the U-shaped band 53 is disposed at a position such that the distance L1 between the curved portion 53D of the U-shaped band 53 and the center O of the boss portion 57 is greater than the distance L2 between the center O of the boss portion 57 and the third wall 60C located at the vehicle body end side of the boss portion 57.

Thus, even in a case where the height of the U-shaped band 53 is formed larger, interference between the U-shaped band 53 and the knuckle 38 when the suspension arm assembly 33 operates can be prevented because the space A is formed between the curved portion 53D of the U-shaped band 53 and the boss portion 57.

In addition, in the present embodiment, the U-shaped band 53 is formed so that the end portions 53B and 53C can be narrower than the curved portion 53D. Thus, even when the height of the U-shaped band 53 is formed larger, when the suspension arm assembly 33 is operated, interference between the U-shaped band 53 and the knuckle 38 can be prevented, because the height H4 of the end portions 53B and 53C of the U-shaped band 53 near the center O of the boss portion 57 is formed smaller than the height of other portions of the U-shaped band.

Furthermore, in the present embodiment, the outer circumferential end portion of the plate portion 56 is bent downward so as to surround the boss portion 57, thereby forming the second and third walls 60B and 60C. In this manner, the height H3 of each of the third wall portions 60C is formed smaller than the height H2 of each of the second wall portions (other portions) 60B, so that the rigidity of the boss portion 57 can be increased. In addition, since interference between the knuckle 38 and the third wall 60C can be prevented, when the suspension arm assembly 33 operated, the moving range of the knuckle 38 can be wider. The knuckle 38 is attached to the boss portion 57, the third wall 60C located at the distal end, at the outer side of the vehicle, of the joint member 55.

The illustrative embodiment of the present invention has been described. However, various modifications and changes can be made on the basis of the technical idea of the present invention.

For example, although the plate portion 56 of the joint member 55 is attached to the pair of the front pipe 50 and the rear pipe 51 so as to cover the U-shaped band 53 from above in this embodiment, the plate portion 56 of the joint member 55 may be attached from below the pair of the front pipe 50 and the rear pipe 51 as long as the plate portion 56 of the joint member 55 covers the U-shaped band 53. Moreover, in this embodiment, a case is described where the present invention is applied to the upper arm 33 as the suspension arm assembly. However, the present invention is not limited to this, and may be applied to the lower arm 34 as a matter of course.

Also, the present invention can be applied to, for example, a vehicle having wheels exceeding three or four, and also a vehicle other than a multi-use vehicle (MUV) appropriate for driving on unleveled ground (rough ground), as a matter of course. In addition, various changes can be made to the present invention without departing from the scope of the present invention.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. In a vehicle comprising a vehicle body frame, a vehicle body mounted on the vehicle body frame and a suspension system attached to the vehicle body frame and comprising a shock absorber and a knuckle, comprising a suspension arm assembly comprising:
   a pivot pipe pivotally attached to the vehicle body frame;
   a pair of pipes attached to the pivot pipe and extending in a lateral direction of the vehicle body;
   a joint member attached to distal end portions of the pair of pipes, said joint member comprising a plate portion, and a boss portion attached to said knuckle; and
   a substantially U-shaped band arranged at the distal end portions of the pair of pipes such that an open concave surface of the U-shaped band faces outwardly of the vehicle body, and a convex surface of the U-shaped band extends inwardly toward a longitudinal center line of the vehicle body frame;
   wherein the pair of pipes comprise:
      proximal end portions connected to the pivot pipe and spaced apart from each other in a front-rear direction of the vehicle body, and
      the distal end portions arranged proximate one another and extended toward an exterior of the vehicle body so as to form a substantially triangular profile, said distal end portions disposed laterally outside of the vehicle body frame;
   wherein the distal end portions of the pair of pipes are operatively connected to the convex surface of the U-shaped band; and
   wherein the plate portion of the joint member is attached to the pair of pipes so as to substantially cover the U-shaped band from an upper or a portion thereof.

2. The suspension arm assembly for a vehicle according to claim 1, wherein an outer circumferential end portion of the plate portion of the joint member has a distal end portion adjacent the exterior of the vehicle body, wherein the outer circumferential end portion is bent downwardly in an area adjacent the boss portion, and
   wherein when viewed in a side view, the distal end portion of the plate portion of the joint member has a height less than other portions thereof.

3. The suspension arm assembly for a vehicle according to claim 1, wherein when viewed in a side view, the U-shaped band is formed such that distal end portions thereof are narrower than other portions thereof.

4. The suspension arm assembly for a vehicle according to claim 3, wherein an outer circumferential end portion of the plate portion of the joint member has a distal end portion adjacent the exterior of the vehicle body, wherein the outer circumferential end portion is bent downwardly in an area adjacent the boss portion, and
   wherein when viewed in a side view, the distal end portion of the plate portion of the joint member has a height less than other portions thereof.

5. The suspension arm assembly for a vehicle according to claim 1,
   wherein the U-shaped band is disposed at a position such that a first distance between the convex portion of the U-shaped band and a center of the boss portion is longer than a second distance between the center of the boss portion and a distal end of the boss portion, and
   wherein the boss portion and the U-shaped band are spaced away from each other.

6. The suspension arm assembly for a vehicle according to claim 5, wherein when viewed in a side view, the U-shaped band is formed such that distal end portions thereof are narrower than other portions thereof.

7. The suspension arm assembly for a vehicle according to claim 5, wherein an outer circumferential end portion of the plate portion of the joint member has a distal end portion adjacent the exterior of the vehicle body, wherein the outer circumferential end portion is bent downwardly in an area adjacent the boss portion, and
   wherein when viewed in a side view, the distal end portion of the plate portion of the joint member has a height less than other portions thereof.

8. The suspension arm assembly for a vehicle according to claim 1, wherein an outer circumferential end portion of the plate portion of the joint member is bent downwardly adjacent the boss portion thereby forming a wall such that, when viewed in a cross sectional view, the plate portion has a substantially angular U-shaped profile.

9. The suspension arm assembly for a vehicle according to claim 8,
   wherein the U-shaped band is disposed at a position such that a first distance between the convex portion of the U-shaped band and a center of the boss portion is longer than a second distance between the center of the boss portion and a distal end of the boss portion, and wherein the boss portion and the U-shaped band are spaced away from each other.

10. The suspension arm assembly for a vehicle according to claim 8, wherein when viewed in a side view, the U-shaped band is formed such that distal end portions thereof are narrower than other portions thereof.

11. The suspension arm assembly for a vehicle according to claim 8, wherein an outer circumferential end portion of the plate portion of the joint member has a distal end portion adjacent the exterior of the vehicle body, wherein the outer circumferential end portion is bent downwardly in an area adjacent the boss portion, and
   wherein when viewed in a side view, the distal end portion of the plate portion of the joint member has a height less than other portions thereof.

12. A multi-use vehicle, comprising:
   a vehicle body frame;
   a suspension arm assembly connected to the vehicle body frame;
   a shock absorber disposed between said vehicle body frame and said suspension arm assembly; and
   a knuckle connected with said suspension arm assembly;
   wherein the suspension arm assembly comprises:
   a pivot pipe pivotally attached to the vehicle body frame; and
   a pair of pipes extending in a lateral direction of the vehicle body frame, the pair of pipes comprising proximal end portions connected to the pivot pipe and spaced apart from each other in a front-rear direction of the vehicle body, and distal end portions arranged proximate one another, and extended toward an exterior of the vehicle body so as to form a substantially triangular profile; said distal end portions disposed external to the vehicle body frame;
   a joint member attached to the distal end portions of the pair of pipes, said joint member comprising a plate portion and a boss portion attached to said knuckle; and
   a substantially U-shaped band arranged at the distal end portions of the pair of pipes such that an open concave surface of the U-shaped band faces outwardly of the vehicle body;
   wherein the distal end portions of the pipes are connected to a convex surface of the U-shaped band; and wherein the plate portion of the joint member is attached to the pair of pipes so as to cover the U-shaped band from an upper or a lower portion thereof.

13. A multi-use vehicle according to claim 12, wherein the U-shaped band is disposed at a position such that a first distance between the convex portion of the U-shaped band and a center of the boss portion is greater than a second distance between the center of the boss portion and a distal end portion of the boss portion, and wherein the boss portion and the U-shaped band are spaced away from each other.

14. A multi-use vehicle according to claim 12, wherein when viewed in a side view, the U-shaped band is formed such that distal end portions thereof are narrower than other portions thereof.

15. A multi-use vehicle according to claim 12, wherein an outer circumferential end portion of the plate portion of the joint member has a distal end portion at the exterior of the vehicle body, wherein the outer circumferential end portion is bent so as to surround the boss portion, and
   wherein when viewed in a side view, the distal end portion of the plate portion of the joint member has a height less than other portions thereof.

16. A multi-use vehicle according to claim 12, wherein an outer circumferential end portion of the plate portion of the joint member is bent adjacent the boss portion such that, when viewed in a cross sectional view, the plate portion is formed in a substantially angular U-shaped profile.

17. A multi-use vehicle according to claim 16, wherein the U-shaped band is disposed at a position such that a first distance between the convex portion of the U-shaped band and a center of the boss portion is greater than a second distance between the center of the boss portion and a distal end portion of the boss portion, and wherein the boss portion and the U-shaped band are spaced away from each other.

18. A double wishbone-type suspension system for a vehicle having a body frame, said suspension system comprising
   a knuckle;
   a pivot pipe pivotally attached to the body frame;
   a pair of pipes arranged in a longitudinal direction of the vehicle,
   the pair of pipes having
      proximal end portions spaced apart from each other, and connected to the pivot pipe, and
      distal end portions arranged proximate one another, and extended outwardly so as to form a substantially triangular profile; defining distal end portions of the pipes;
   a joint member attached to the distal end portions of the pipes, said joint member comprising a plate portion, and a boss portion attached to said knuckle; and
   a substantially U-shaped band arranged at the distal end portions of the pipes such that an open concave surface of the U-shaped band is situated facing outwardly;
   wherein
   the distal end portions of the pair of pipes are connected to a convex surface of the U-shaped band; and
   the plate portion of the joint member is attached to the pair of pipes so as to cover the U-shaped band from one of an upper or a lower portion thereof.

19. A double wishbone-type suspension system according to claim 18, wherein an outer circumferential end portion of the plate portion of the joint member is bent for surrounding the boss portion thereby forming a wall portion such that, when viewed in a cross sectional view, the plate portion is formed in a substantially angular U-shaped profile having an opening on a side portion thereof.

20. A double wishbone-type suspension system according to claim 18,
   wherein the U-shaped band is disposed at a position such that a first distance between the convex portion of the U-shaped band and a center of the boss portion is greater than a second distance between the center of the boss portion and a distal end portion of the boss portion, and
   wherein the boss portion and the U-shaped band are arranged spaced away from each other.

* * * * *